United States Patent [19]

Ohmori et al.

[11] Patent Number: 4,630,514
[45] Date of Patent: Dec. 23, 1986

[54] ROTARY DRUM SHEAR

[75] Inventors: Shunji Ohmori; Hiroyuki Takenaka; Akira Hozoji; Kazunori Kono; Kiyomitsu Yoshikawa; Seishi Kajihara, all of Mitsubishi, Japan

[73] Assignee: Mitsubishi Jukogyo Kabushiki Kaisha, Japan

[21] Appl. No.: 707,844

[22] Filed: Mar. 4, 1985

[51] Int. Cl.4 ............................................. B23D 25/12
[52] U.S. Cl. ....................................... 83/342; 83/341; 83/672
[58] Field of Search .................. 83/341, 295, 342, 344

[56] References Cited

U.S. PATENT DOCUMENTS 4,034,637 7/1977 Ollery ................................. 83/341
4,183,271 1/1980 Martin ............................. 83/295 X Primary Examiner—Donald R. Schran
Attorney, Agent, or Firm—McGlew and Tuttle

[57] ABSTRACT

A rotary drum shear including two drums rotating in the opposite direction to each other and each having a spiral knife on the periphery thereof so that material fed between the drums is cut by engagement of the knives brought by the rotation of the drums in which the knives are formed so that a distance from a rotational center of the drums to the engagement position of the knives is gradually reduced along an axis of the drums from a start point of the engagement of the knives.

3 Claims, 6 Drawing Figures

F I G. 5
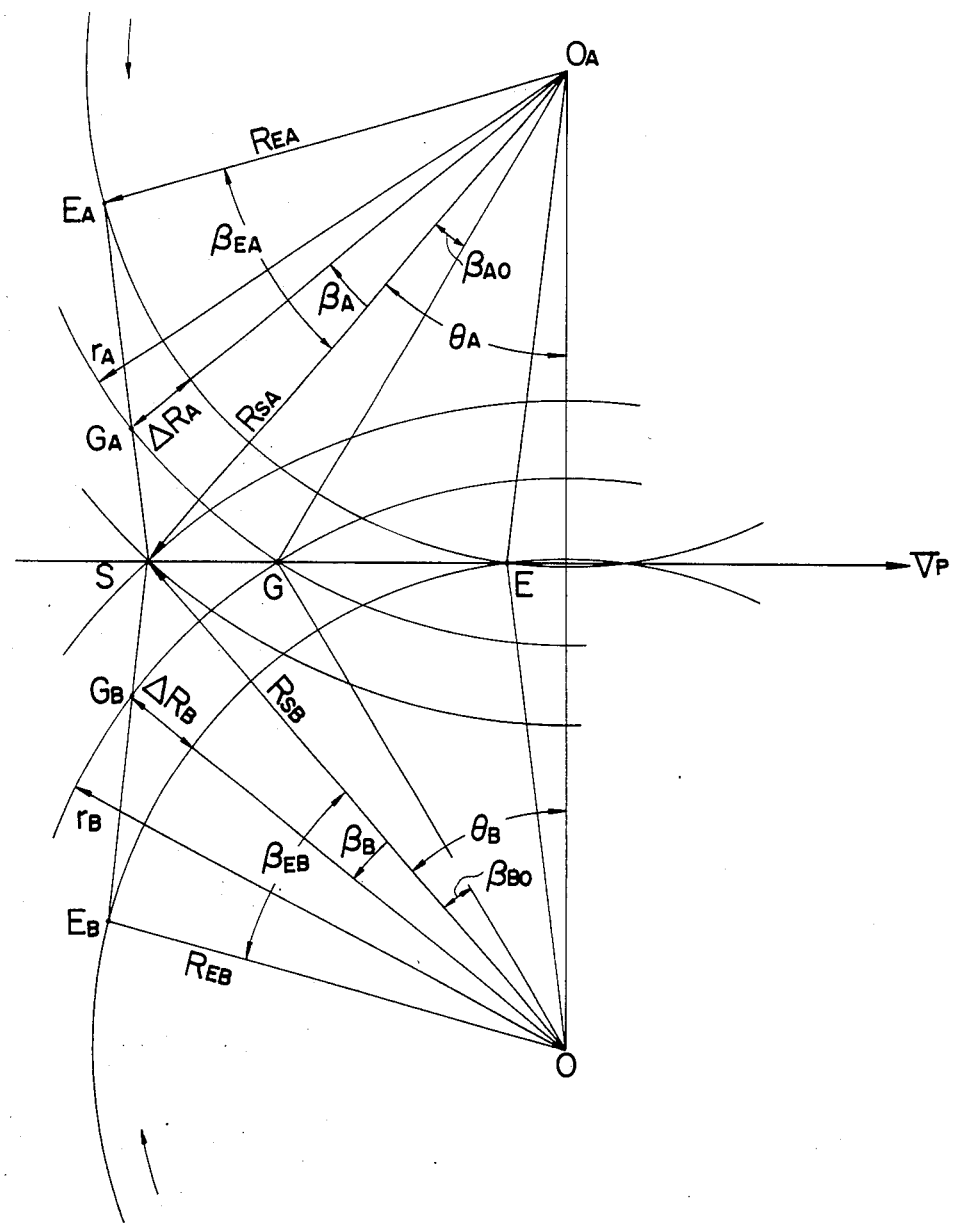

ROTARY DRUM SHEAR

FIELD AND BACKGROUND OF THE INVENTION

The present invention relates to a rotary drum shear which cuts a continuously fed long plate such as steel plate or corrugated cardboard at a substantially right angle to the feeding direction of the plate.

A prior art rotary drum shear includes drums which are rotatably disposed at the upper and lower sides and carry straight knives fixedly mounted substantially parallely along an axis of the drums, respectively. The drums are rotated in the opposite direction to each other so that the knives mounted on the drums are engaged with each other once per rotation to cut a long material fed between the drums by the engagement of the knives.

With such a device, when the feeding speed of the material to be always cut changes, it is necessary to increase or decrease the rotational speed of the drums in response to the feeding speed of the material in order to cut the material at a predetermined length exactly. Accordingly, large load is applied to a motor for driving the upper and lower drums and a high-powered motor is required.

As a countermeasure, if load in other portions is lightened, it is possible to use a low-powered motor with low consumption energy. For this purpose, it is considered that a value $GD^2$ (where G is weight and D is a diameter of the drum) of the drum and a rotating system in the rotary drum shear is reduced. However, since there is a close relation between the $GD^2$ value and a rigidity, if the $GD^2$ value is reduced, a flexural rigidity or torsional rigidity of the drum is deceased and the following deficiencies are caused.

While it is required not to enlarge a gap between both the knives in order to cut the material sharply and smoothly, if the rigidity of the drums for supporting the knives is small, the drums are largely bent due to large cutting load generated when cutting and the gap between the knives is enlarged, thereby damaging the cutting quality and the cutting ability greatly.

In order to solve the above problem, there has been recently proposed a method in which curved or spiral knives on the drums are used. According to a theoretical and experimental study by the inventor when the curved knives are used, cutting load can be greatly reduced. In other words, assuming that the cutting load is 1 when a lead angle of the knives that is an angle of the knives with regard to an axial line of the drums is 0.5°, the cutting load is about 0.5 when the lead angle is 1°, the load is about 0.25 when the angle is 2°, the load is about 0.17 when the angle is 3°, the load is about 0.13 when the angle is 4°, and the load is about 0.1 when the angle is 5°. Thus, the cutting load can be reduced as the lead angle is increased. Accordingly, the rigidity and the $GD^2$ value of the rotating drums can be reduced, so that the power of the motor can be reduced and energy can be saved.

As described above, by using the spiral knives in the rotary drum shear, there can be expected large merits. However, there is a disadvantage that the material is obliquely cut.

FIG. 1(a) is a view showing a rotary drum shear including spiral knives and the cutting operation thereof. FIG. 1(b) shows a sectional view of the knives in the engagement condition taken along line I—I of FIG. 1(a). In FIG. 1(a), numerals 1 and 2 denote upper and lower drums, respectively, which is rotated at an equal speed and in the opposite direction to each other, numerals 3 and 4 denote knives mounted spirally on the external peripheries of the drums 1 and 2, respectively, and numeral 5 denotes a long material to be cut which is fed between the drums 1 and 2. The material 5 is fed between the drums in a perpendicular direction to rotational axes of the drums 1 and 2. However, the cutting line for the material is inclined by an angle of 90°-α with regard to the feeding direction as shown in FIG. 1(a).

The reason why the cutting line is inclined is because engagement angles $\theta_A$ and $\theta_B$ at any engagement points in the axial direction of the drums are constant and the knives are always engaged with each other at the same position S since cutting edges of the knives 3 and 4 are held on circles having centers $O_A$ and $O_B$, respectively, so that it takes a certain time to elapse from a start time to a termination time of the engagement and its time delay causes cutting inclination in the material to be cut.

SUMMARY OF THE INVENTION

It is an object of the present invention to provide a rotary drum shear including spiral knives and preventing the inclination of the cutting line due to cutting lag, thereby saving energy by reducing the load applied to the drum shear.

In order to achieve the above object, the gist of the present invention resides in that two drums rotating in opposite directions to each other and each having a spiral knife on the periphery thereof are provided so that material fed between the drums is cut by engagement of the knives brought by the rotation of the drums and the knives are formed so that a distance from a rotational center of the drums to the engagement position of the knives is gradually reduced along an axis of the drums from a start point of the engagement of the knives.

BRIEF DESCRIPTION OF THE DRAWINGS

The rotary drum shear according to the present invention will now be described in detail with reference to an embodiment shown in drawings, in which:

FIG. 5 is a projected view of the knives of FIG. 4 in the direction Z.

DESCRIPTION OF THE PREFERRED EMBODIMENT

Figure 2:
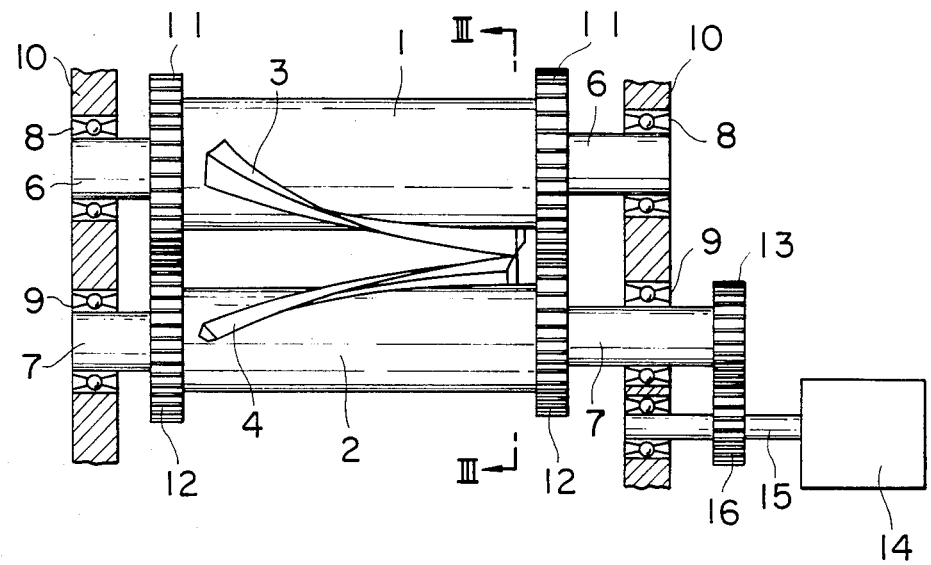
FIG. 2 is a front view of a rotary drum shear according to an embodiment of the present invention.
Figure 3:
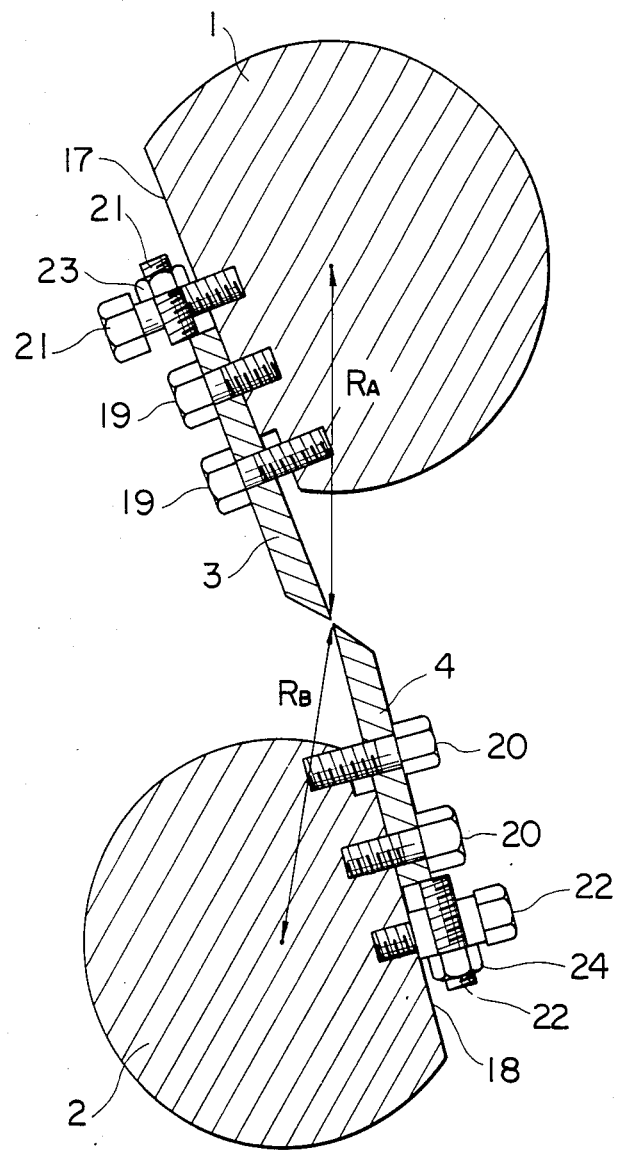
FIG. 3 is a sectional view of the rotary drum shear of FIG. 3 taken along line III—III of FIG. 3.

In FIGS. 2 and 3, numerals 1 and 2 denote upper and lower drums, respectively, each having shafts 6 and 7 of which ends are rotatably mounted on a frame 10 through bearings 8 and 9, respectively. Gears 11 and 12 which are fixedly mounted on the shafts 6 and 7 at both sides of the drums 1 and 2, respectively, are meshed with each other. A further gear 13 is fixedly mounted on the shaft 7 of the drum 7 at the outside of the frame 10. The gear 13 is meshed with a gear 16 mounted on a drive shaft 15 of a motor 14. Thus, the motor 14 rotates the upper and lower drums 1 and 2 in the opposite direction to each other and at the equal rotational speed (equal angular velocity).

Knives 3 and 4 are spirally mounted on the peripheries of the drums 1 and 2, respectively. More particularly, as shown in FIG. 3, fitting planes 17 and 18 are spirally formed on the upper and lower drums 1 and 2 and the knives 3 and 4 are fixedly mounted on the planes 17 and 18 by means of bolts 19 and 20. Adjusting bolts 21 and 22 and adjusting nuts 23 and 24 are provided on back sides of the knives 3 and 4 so that positions of the knives 3 and 4 can be adjusted finely.

Figure 4:
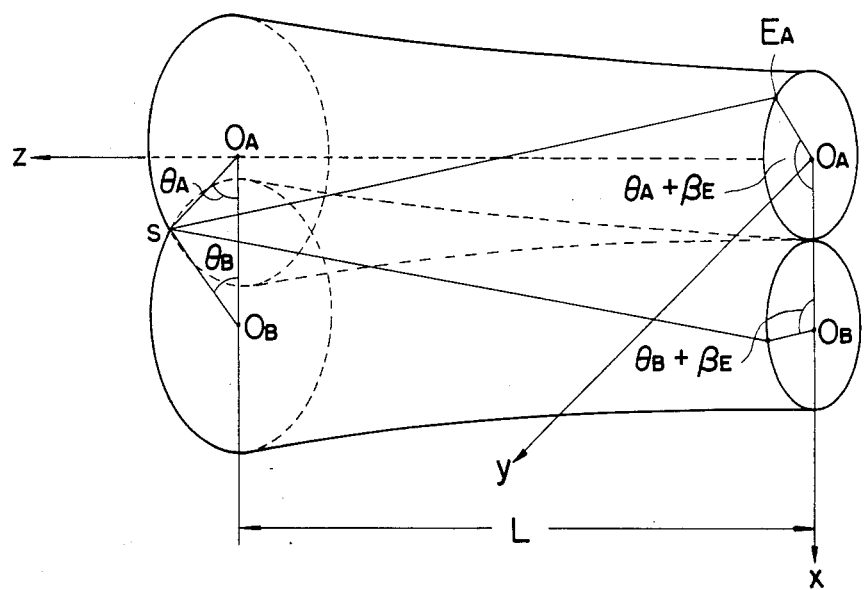
FIG. 4 schematically illustrates the construction of knives according to an embodiment.

Thus, the upper and lower knives 3 and 4 are formed so that distances $R_A$ and $R_B$ each extending from the rotational center of the drum to the engagement position of the knives 3 and 4 are gradually reduced from a start position of the engagement along the axis of the knives 3 and 4. In other words, as schematically illustrated in FIG. 4, it is considered that cutting edges of the knives are wound on a conical cylinder.

Figure 1A:
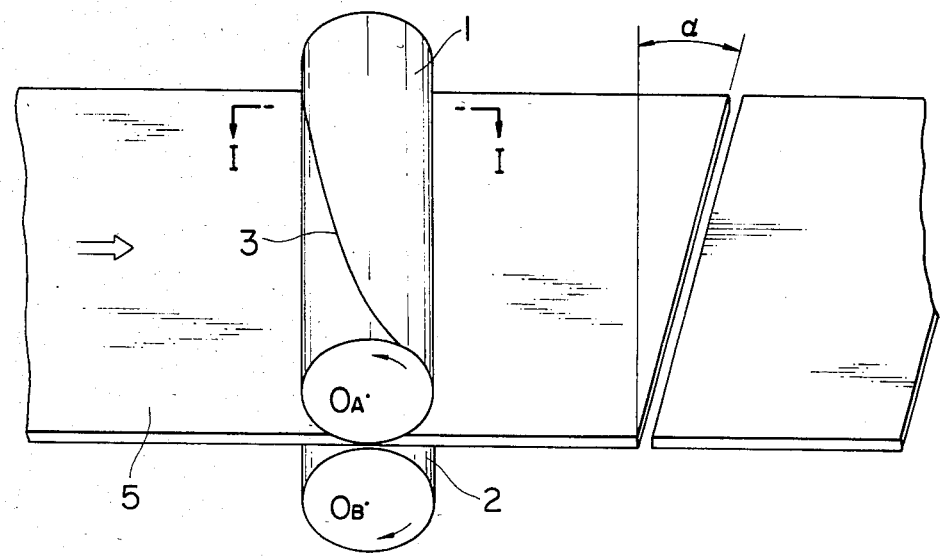
FIGS. 1(a) and 1(b) are a perspective view of a rotary drum shear including spiral knives cutting a material and a sectional view thereof taken along line I—I of FIG. 1(a), respectively.
Figure 1B:
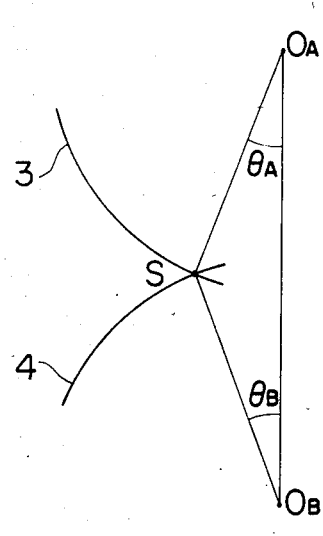

A shape and a fitting state of the knives in which the inclined angle $\alpha$ shown in FIG. 1(a) is reduced to zero will be described. FIG. 5 illustrates a projected state of FIG. 4 in the direction Z as an example of a shape of the knives.

Referring to FIG. 5, the upper knife 3 is shown by a line $\overline{SE_A}$ connecting a start position S of the engagement to a termination position $E_A$ of the engagement and the lower knife 4 is shown by a line $\overline{SE_B}$ in the same way. In the figure, the knives 3 and 4 are engaged with each other at the start point S. The upper and lower drums 1 and 2 are rotated in the direction indicating arrows, respectively, and the material 5 to be cut moves in the direction of $V_P$.

In order to attain the engagement of the knives 3 and 4 in which the material is not cut obliquely, the engagement point of the knives 3 and 4 is moved from the start point S through a point G on the line $V_P$ toward a point E in accordance with the movement of the material. In other words, the upper and lower knives 3 and 4 are formed so that a certain point $G_A$ on the cutting edge of the upper knife 3 which is away from line $O_AS$ by an angle $\beta_A$ is engaged at the point G with a certain point $G_B$ on the cutting edge of the lower knife 4 which is away from line $O_BS$ by an angle $\beta_B$ in FIG. 5. Accordingly, the following relation is given:

$$r_A = R_{SA} \cdot \frac{\cos\theta_A}{\cos(\theta_A - \beta_{AO})} \quad (1)$$

$$r_B = R_{SB} \cdot \frac{\cos\theta_B}{\cos(\theta_B - \beta_{BO})} \quad (2)$$

where $r_A$ is a distance from the rotational center $O_A$ of the upper drum 1 to the engagement position of the knives, $r_B$ is a distance from the rotational center $O_B$ of the lower drum 2 to the engagement position of the knives, $R_{SA}$ is a distance between the start position S of the engagement of the knives and the center of the knife 1, $R_{SB}$ is a distance between the start position S of the engagement of the knife and the center of the knife 2, $\theta_A$ is an angle between $O_AS$ and $O_AO_B$, $\theta_B$ is an angle between $O_BS$ and $O_AO_B$, $\beta_{AO}$ is an angle between $O_AS$ and $O_AG$ as the center of $O_A$, and $\beta_{BO}$ is an angle between $O_BS$ and $O_BG$ as the center of $O_B$.

On the other hand, in order to engage both the knives indicated by lines $\overline{SE_A}$ and $\overline{SE_B}$ in synchronism with a feeding speed of the material to be cut running from the point S to the point E, if the speed of the material is V, angular velocities $\omega_A$ and $\omega_B$ of the upper and lower knives may be set on the basis of the following equations, respectively.

$$\omega_A = \frac{\beta_A + \beta_{AO}}{R_{SA}\sin\theta_A - r_A\sin(\theta_A - \beta_{AO})} \cdot V \quad (3)$$

$$\omega_B = \frac{\beta_B + \beta_{BO}}{R_{SB}\sin\theta_B - r_B\sin(\theta_B - \beta_{BO})} \cdot V \quad (4)$$

In the above equations, when $r_A = R_{SA}$, that is, when the distance from the center of the drum to the engagement position of the knife is not gradually reduced and always constant, denominators in the above equations are equal to 0 and the angular velocities are infinite and not realistic.

FIG. 5 shows a shape of the knife when $\beta_{AO} = \beta_A$ and $\beta_{BO} = \beta_B$ by way of example. The angular velocities required in this case are finite. By substituting the equations (1) and (2) for the equations (3) and (4), the following equations are obtained.

$$\omega_A = \frac{2\beta_A\cos(\theta_A - \beta_A)}{R_{SA}\{\sin\theta_A\cos(\theta_A - \beta_A) - \cos\theta_A\}} \cdot V \quad (5)$$

$$\omega_B = \frac{2\beta_B\cos(\theta_B - \beta_B)}{R_{SB}\{\sin\theta_B\cos(\theta_B - \beta_B) - \cos\theta_B\}} \cdot V \quad (6)$$

When the length between the start point S and the termination points $E_A$ and $E_B$ along the axis Z is L and the angles between the start point S and the termination points Ea and Eb projected on the plane XY are $\beta_{EA}$ and $\beta_{EB}$, respectively, the positions $(X_A, Y_A, Z_A)$ and $(X_B, Y_B, Z_B)$ of the cutting edges of the knives 3 and 4 in the coordinates XYZ of FIG. 4 are given as follows.

$$X_A = r_A \cos(\beta_A + \theta_A) \quad (7)$$

$$Y_A = r_A \sin(\beta_A + \theta_A) \quad (8)$$

$$Z_A = \frac{L}{\beta_{EA}} \cdot \beta_A \quad (9)$$

$$X_B = r_B + r_A - r_B \cos(\beta_B + \theta_B) \quad (10)$$

$$Y_B = r_B \sin(\beta_B + \theta_B) \quad (11)$$

$$Z_B = \frac{L}{\beta_{EB}} \cdot \beta_B \quad (12)$$

When the upper and lower knives 3 and 4 are set in the manner shown in the above equations, it can be attained to cut the material without inclination.

This condition can be formularized as follows.

When the rotating axis of one drum is the axis Z, the axis perpendicular to a plane including the rotating axes of both the drums and perpendicular to the axis Z is the axis Y, the direction perpendicular to the axes Z and Y is the axis X, a running or feeding speed of the material to be cut is V, the length between the start point S of the engagement and the termination points $E_A$ and $E_B$ along the axis Z is L, the angles between the start point S and the termination points $E_A$ and $E_B$ projected on the plane XY are $\beta_{EA}$ and $\beta_{EB}$, respectively, the phases of the start point S in the plane XY are $\theta_A$ and $\theta_B$, the phases of the points of the cutting edges on the drums for the point S in the plane XY are $\beta_A$ and $\beta_B$, and the distances between the start point S and the centers of the drums 1 and 2 are $R_{SA}$ and $R_{SB}$, respectively, the positions $(X_A, Y_A, Z_A)$ and $(X_B, X_B, Z_B)$ of the cutting edges on the drums satisfy the following equations.

$$X_A = r_A \cos(\beta_A + \theta_A)$$

$$Y_A = r_A \sin(\beta_A + \theta_A)$$

$$Z_A = \frac{L}{\beta_{EA}} \cdot \beta_A$$

$$X_B = r_B + r_A - r_B \cos(\beta_B + \theta_B)$$

$$Y_B = r_B \sin(\beta_B + \theta_B)$$

$$Z_B = \frac{L}{\beta_{EB}} \cdot \beta_E$$

$$r_A = R_{SA} \frac{\cos\theta_A}{\cos(\theta_A - \beta_A)}$$

$$r_B = R_{SB} \frac{\cos\theta_B}{\cos(\theta_B - \beta_B)}$$

Further, the running speed V of the material to be cut and the angular velocities $\omega_A$ and $\omega_B$ of the drums 1 and 2 satisfy the following equations.

$$\omega_A = \frac{2\beta_A \cos(\theta_A - \beta_A)}{R_{SA}(\sin\theta_A \cos(\theta_A - \beta_A) - \cos\theta_A)} \cdot V$$

$$\omega_B = \frac{2\beta_B \cos(\theta_B - \beta_B)}{R_{SB}(\sin\theta_B \cos(\theta_B - \beta_B) - \cos\theta_B)} \cdot V$$

In the rotary drum shear according to the present invention, the upper and lower drums 1 and 2 are rotated in the opposite direction to each other and at the same angular speed by the motor 14 and the upper and lower knives 3 and 4 fixedly mounted on the drum 3 and 4, respectively, are approached and engaged with each other once per rotation of the drums 1 and 2 and then separated from each other, such an operational cycle being repeated. Since the knives 3 and 4 are formed so that the distance from the rotational centers of the drums 1 and 2 to the engagement position of the knives is gradually reduced along the axis thereof from the start position of the engagement of the knives 3 and 4, the time lag of cutting operation is restored and the material can be cut substantially perpendicular to the feeding direction of the material.

As actual shapes of the knives 3 and 4 and the drums 1 and 2, there is considered a manner in which the drums 1 and 2 are conical and the width of the knives 3 and 4 is constant, or a manner in which the drums 1 and 2 are cylindrical and the width of the knives 3 and 4 is gradually reduced.

As described above in detail with reference to the embodiment, according to the present invention, the rotary drum shear includes two drums rotating in the opposite direction to each other and each having a spiral knife on the periphery thereof so that material fed between the drums is cut by engagement of the knives brought by the rotation of the drums and the knives are formed so that a distance from a rotational center of the drums to the engagement position of the knives is gradually reduced along the axis of the drums from a start point of the engagement of the knives and the engagement position of the knives is moved in response to the movement of the material to be cut. Accordingly, the material can be cut at the substantially right angle to the feeding direction thereof, resulting in the improvement of the cutting quality, the reduction of the load and saving energy.

We claim:

1. A rotary drum shear comprising, two drums rotating in opposite directions to each other and around spaced-apart parallel axes and each having a spiral knife on the periphery thereof so that material fed between the drum in a feed direction is cut by engagement of the knives, the axes being perpendicular to the feed direction, the knives having cutting edges which is at a radii $r_A$ and $r_B$ from the axis of their respective drums that are gradually reduced along the axis of the drums from a starting point of engagement between the knives, whereby a cut which is perpendicular to the feed direction can be made.

2. A rotary drum shear according to claim 1, wherein when a rotating axis of one of the drums is an axis Z, an axis perpendicular to a plane including rotating axis of both the drums and perpendicular to the axis Z is an axis Y, a direction perpendicular to the axes Z and Y is an axis X, a feeding speed of the material to be cut is V, a length between a start point S of the engagement and termination points $E_A$ and $E_B$ along the axis Z is L, angles between the start point S and the termination points $E_A$ and $E_B$ projected on a plane XY are $\beta_{EA}$ and $\beta_{EB}$, respectively, phases of the start point S in the plane XY are $\theta_A$ and $\theta_B$, phases of points of the cutting edges on the drums for the point S in the plane XY are $\beta_A$ and $\beta_B$, phases of a point G in which the cutting edge of the drums cuts the material with regard to the point S are $\beta_{AO}$ and $\beta_{BO}$, and distances between the start point S and centers of the drums are $R_{SA}$ and $R_{SB}$, respectively, positions $(X_A, Y_A, Z_A)$ and $(X_B, Y_B, Z_B)$ of the cutting edges on the drums satisfy the following equations, $$X_A = r_A \cos(\beta_A + \theta_A)$$

$$Y_A = r_A \sin(\beta_A + \theta_A)$$

$$Z_A = \frac{L}{\beta_{EA}} \cdot \beta_A$$

$$X_B = r_B + r_A - r_B \cos(\beta_B + \theta_B)$$

$$Y_B = r_B \sin(\beta_B + \theta_B)$$

$$Z_B = \frac{L}{\beta_{EB}} \cdot \beta_B$$

$$r_A = R_{SA} \frac{\cos\theta_A}{\cos(\theta_A - \beta_{AO})}$$

$$r_B = R_{SB} \frac{\cos\theta_B}{\cos(\theta_B - \beta_{BO})}.$$

3. A rotary drum shear according to claim 2, including means wherein the feeding speed V of the material to be cut and angular velocities $\omega_A$ and $\omega_B$ of the drums satisfy the following equations, $$\omega_A = \frac{2\beta_A \cos(\theta_A - \beta_A)}{R_{SA}(\sin\theta_A \cos(\theta_A - \beta_A) - \cos\theta_A)} \cdot V$$

$$\omega_B = \frac{2\beta_B \cos(\theta_B - \beta_B)}{R_{SB}(\sin\theta_B \cos(\theta_B - \beta_B) - \cos\theta_B)} \cdot V.$$

* * * * *